(12) United States Patent
Benkreira et al.

(10) Patent No.: US 12,437,300 B2
(45) Date of Patent: Oct. 7, 2025

(54) SYSTEM, METHOD, AND COMPUTER-ACCESSIBLE MEDIUM FOR GEO-FENCED ZONES

(71) Applicant: Capital One Services, LLC, McLean, VA (US)

(72) Inventors: Abdelkader Benkreira, Washington, DC (US); Michael Mossoba, Arlington, VA (US); William Carroll, Huntingtown, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/528,870

(22) Filed: Dec. 5, 2023

(65) Prior Publication Data
US 2024/0242222 A1 Jul. 18, 2024

Related U.S. Application Data

(63) Continuation of application No. 16/990,220, filed on Aug. 11, 2020, now Pat. No. 11,880,843.

(51) Int. Cl.
| | |
|---|---|
| *G06Q 20/40* | (2012.01) |
| *G06F 16/23* | (2019.01) |
| *G06Q 20/06* | (2012.01) |
| *G06Q 20/22* | (2012.01) |
| *G06Q 20/24* | (2012.01) |
| *G06Q 20/32* | (2012.01) |
| *G06Q 20/36* | (2012.01) |

(Continued)

(52) U.S. Cl.
CPC ... *G06Q 20/40155* (2020.05); *G06F 16/2379* (2019.01); *G06Q 20/0655* (2013.01); *G06Q 20/24* (2013.01); *G06Q 20/29* (2013.01); *G06Q 20/3224* (2013.01); *G06Q 20/3676* (2013.01); *G06Q 30/0185* (2013.01); *G06N 3/04* (2013.01); *G06Q 2220/00* (2013.01)

(58) Field of Classification Search
CPC ............... G06Q 20/00–425; H04L 9/00–50
See application file for complete search history.

(56) References Cited

U.S. PATENT DOCUMENTS 9,898,737 B2 * 2/2018 Smith ............ G06Q 20/3276
2009/0239552 A1 9/2009 Churchill et al.
(Continued)

OTHER PUBLICATIONS

Joseph Poon et al., The Bitcoin Lightning Network, https://web.archive.org/web/20170629090805if_/http://lightning.network/lightning-network-paper-DRAFT-0.5.pdf (Year: 2017).*
(Continued)

*Primary Examiner* — Ari Shahabi
(74) *Attorney, Agent, or Firm* — HUNTON ANDREWS KURTH LLP

(57) ABSTRACT

Exemplary systems, methods, and computer-accessible mediums can include, for example, receiving a first location of a user(s) and time information associated with that location, initiating a record for the user(s) based on the location and the time information, receiving a second location of the user(s), where the second location can be in a second bounded area, storing in record, a transaction(s) associated with the user(s) based on the second location, and automatically initiating a single payment for the transaction(s) when the user(s) leaves the first location.

19 Claims, 10 Drawing Sheets

Method (900)

(51) Int. Cl.
*G06Q 30/018* (2023.01)
*G06N 3/04* (2023.01)

(56) References Cited

U.S. PATENT DOCUMENTS

| | | |
|---|---|---|
| 2010/0332339 A1 | 12/2010 | Patel et al. |
| 2011/0231292 A1 | 9/2011 | McCown |
| 2011/0313874 A1 | 12/2011 | Hardie et al. |
| 2012/0084177 A1 | 4/2012 | Tanaka et al. |
| 2013/0030931 A1 | 1/2013 | Moshfeghi |
| 2013/0046602 A1 | 2/2013 | Grigg et al. |
| 2013/0091452 A1 | 4/2013 | Sorden et al. |
| 2015/0019432 A1 | 1/2015 | Burns |
| 2015/0087263 A1 | 3/2015 | Branscomb |
| 2015/0154578 A1 | 6/2015 | Aggarwal et al. |
| 2016/0210606 A1* | 7/2016 | Henderson ........... G06Q 20/204 |
| 2016/0241997 A1* | 8/2016 | Lucas ................... H04W 4/021 |
| 2017/0364900 A1* | 12/2017 | Hudson ................ H04W 4/021 |
| 2018/0150865 A1* | 5/2018 | Arora ................. G06Q 20/3678 |

OTHER PUBLICATIONS

"Proximity Marketing using Beacon Technolgy" (2015) Buy Beacons (https://store.beaconstea.com?utm_source=buybutton&utm_medium=website&utm_campaign=homepage#howtobuy).

Joseph Poon et al., The Bitcoin Lightning Network:, The Waybackmachine, Jun. 9, 2017, pp. 1-22, XP055732221, Retrieved from the Internet: URL:https://web.archive.org/web/20170629090805if_http://lightning-network-paper-DRAFT-0.5.pdf.

International Search Report and the Written Opinion of the International Searching Authority issued in related PCT Application No. PCT/US2021/044442, mailed Nov. 23, 2021.

Notification Concerning Transmittal of International Preliminary Report on Patentability from related PCT Application No. PCT/US2021/044442, mailed Feb. 23, 2023.

* cited by examiner

System (100)

System (100)

System (100)

System (100)

Device (500)

Processing Circuitry (510)

System (600)

Method (700)

Method (800)

Method (900)

SYSTEM, METHOD, AND COMPUTER-ACCESSIBLE MEDIUM FOR GEO-FENCED ZONES

CROSS REFERENCE TO RELATED APPLICATION

This application is a continuation of U.S. patent application Ser. No. 16/990,220 filed Aug. 11, 2020, the complete disclosure of which is incorporated herein by reference in its entirety.

FIELD OF THE DISCLOSURE

The present disclosure relates generally to generating optimizing exchange of geographically-derived information, and more specifically, to an exemplary system, method, and computer-accessible medium for geo-fenced zones.

BACKGROUND INFORMATION

In a typical day, a person can make a large number of relatively small transactions. For example, a person can purchase breakfast in the morning, lunch in the afternoon, dinner in the evening, and can perform any number of other small transactions throughout the day. Payment cards, such as credit cards, debit cards, charge cards and gift cards, represent a significant portion of the day-to-day transactions. In order to purchase something with a transaction, the purchaser will present their credit card and either swipe the credit card in a credit card reader where the reader will read a magnetic strip, insert the credit card into the machine for the machine to read a chip on the credit card, or, if the card is a contactless card, to bring the card within the communication field of the reader. The credit card reader will then send information regarding the transaction over a network (e.g., wired, wireless, etc.) for approval by a financial institution. This process can be as short as 5 to 10 seconds from card insertion to transaction completion.

In addition to credit card transactions, other electronic-based transactions are becoming increasingly commonplace. For example, cryptocurrencies have recently gained popularity as a financial instrument, and more and more vendors accept cryptocurrency as a form of payment. In contrast to credit card transactions, which are extremely quick, cryptocurrency-based transactions can be relatively slow. Thus, cryptocurrency-based transactions cannot be suitable for the microtransactions that typically take place. This problem is exacerbated in places such as zoos, shopping malls, or amusement parks, where a user can engage in many microtransactions throughout the day, constantly moving and making different purchases at different locations.

Thus, it can be beneficial to provide an exemplary systems, methods, and computer-accessible mediums for geo-fenced zones which can overcome the deficiencies described herein.

SUMMARY OF EXEMPLARY EMBODIMENTS

Embodiments of the present disclosure provide a system, method, and computer-accessible medium can include, for example, receiving a first location of a user(s) and time information associated with the user(s), where the first location can be within a first bounded area, initiating a transaction history record for the user(s) based on the location and time information, receiving a second location of the user(s), where the second location can be in a second bounded area that can be contained within the first bounded area, storing, in the transaction history record, a transaction(s) associated with the user(s) based on the second location, and automatically initiating a single payment for the transaction(s) when the user(s) leaves the first location.

Embodiments of the present disclosure provide a system, method, and computer-accessible medium can include, for example, receiving a first location of a user(s) and time information associated with the user(s), where a first location can be within a first bounded area, initiating a transaction history record for the user(s) based on the location and the time information, receiving a second location of the user(s), where the second location can be in a second bounded area that is contained within the first bounded area, storing a first transaction associated with the user(s) based on the second location, receiving a third location of the at user(s), where the third location can be in a third bounded area that is contained within the first bounded area, storing s second transaction associated with the user(s) based on the third location; and automatically initiating a single payment for the first transaction and the second transaction when the user(s) leaves the first location.

Embodiments of the present disclosure provide a system, method, and computer-accessible medium can include, for example, receiving a first location a user(s) and time information associated with the user(s), where the first location is within a first bounded area, initiating a transaction history record for the user(s) based on the location and the time information, receiving a second location of the user(s), where the second location can be in a second bounded area that can be contained within the first bounded area, storing a transaction(s) associated with the user(s) based on the second location, transmitting a verification request to the user(s) based on the second location, receiving a confirmation or a rejection of the verification request from the user(s), and automatically initiating a payment for the transaction(s) based on the confirmation or the rejection when the user(s) leaves the first location.

DETAILED DESCRIPTION OF EXEMPLARY EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The exemplary systems, methods, and computer-accessible mediums can utilize the geo-location of a user or user's device to create an automatic transactional system between the user and the owner of the location where the user is, which can include a transaction history record of the user. The user can engage in multiple transactions with vendors throughout a geo-fenced location, which can be aggregated for later final payment. These transactions can be modified based a parameter stored in the transaction history record. These transactions can be performed securely, efficiently, thereby facilitating microtransactions. These microtransactions can also be performed rapidly, thereby facilitating numerous microtransaction with a period of time.

Additional advantages can be achieved through the use of the automatic transaction network and geo-fenced billing zones. These can include improving the user can be improved and the promotion of commercial and recreational activity. Further, as microtranscations can be in small amounts and occur frequently within a time period, the use of the automatic transaction network and geo-fenced billing zones can increase microtransaction security and reduce the risk of fraud.

Figure 1:
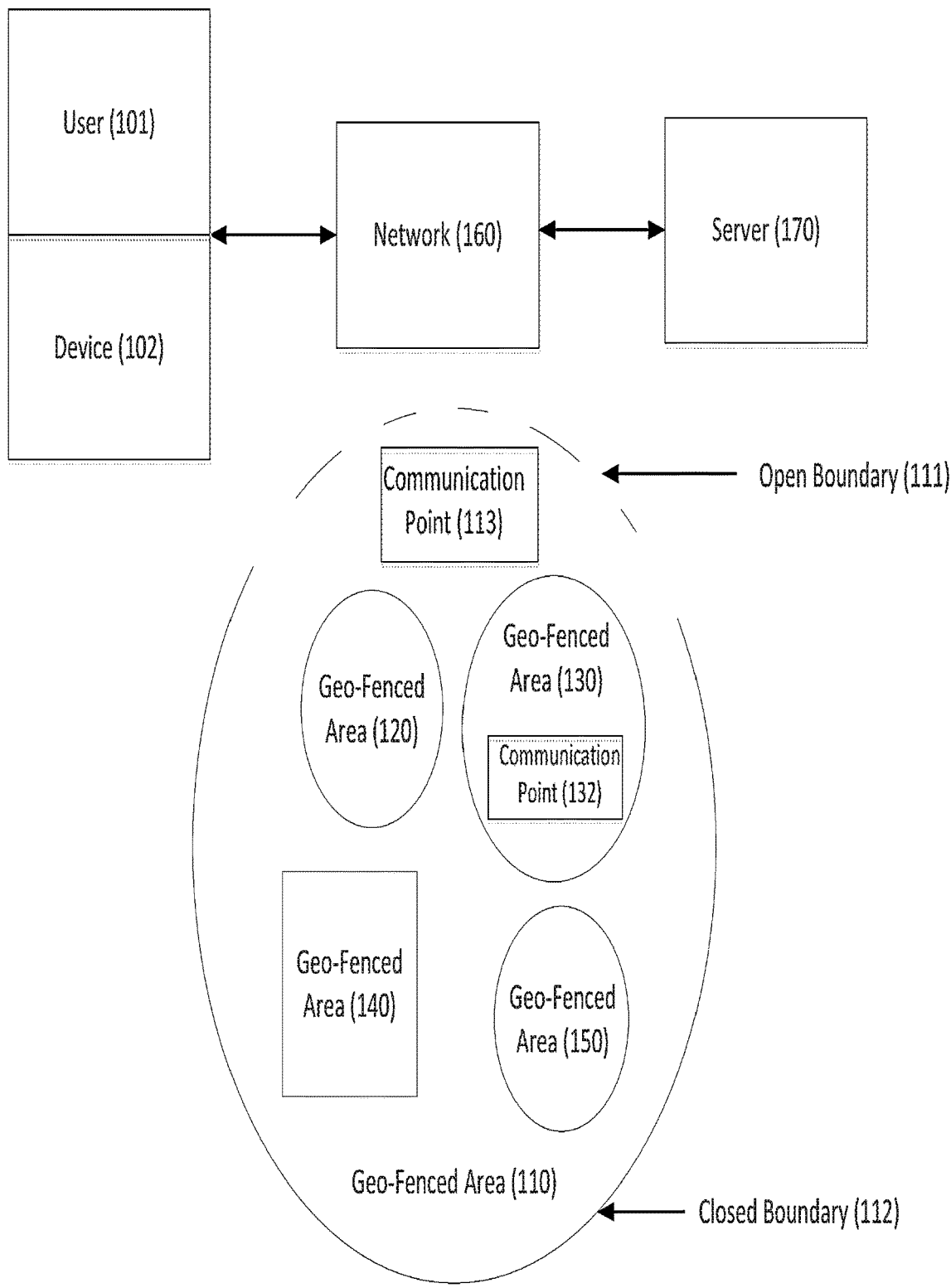
FIG. 1 is a diagram illustrating a geo-fenced location system according to an exemplary embodiment of the present disclosure.

FIG. 1 is a diagram illustrating a geo-fenced location system 100 according to an exemplary embodiment of the present disclosure. FIG. 1 shows a person/user 101 in possession of a network-connected device 102. Device 102 can be, for example, a mobile phone or a smartphone. However, device 102 can be from any class of devices capable of performing the functions described herein. For example, the device 102 can be a laptop, a tablet, a smartcard (e.g., a contactless smartcard), a wearable device (e.g., a smartwatch or smart eyeglasses), or other personal computer devices. Device 102 can be, or can include, custom designed hardware capable of tracking a geographical location and containing other sensors and interfaces.

Device 102 can utilize the Global Positioning System (GPS). Device 102 can also utilize other suitable systems or methods for tracking a geographical location of a user. Such systems can include, but are not limited to, a satellite navigation system, such as global navigation satellite systems (e.g., GPS, GLONASS, Galileo, BeiDou-2, or Region) or other regional navigation satellite systems (e.g., BeiDou-1, NAVIC, QZSS). Other systems, such as terrestrial-based systems (e.g., the hyperbolic radio navigation systems of Loran-C) can also be used. As another example, triangulation based on one or more cellular towers and/or one or more Wi-Fi networks can be utilized, for example, through observations of signal strength. In these examples, the tracking can be determined and improved by assessing the strength of the cellular signals and/or Wi-Fi signals received, under the assumption that signal strength increases as proximity to a cellular tower/Wi-Fi network point increases and decreases when proximity decreases. Additionally, in order to increase the accuracy of the determined location, various combinations of tracking systems can be utilized.

As shown in FIG. 1, a geo-fenced area 110 can include an enclosed or confined area. While FIG. 1 shows the geo-fenced area 110 being of a circular shape, the geo-fenced 110 can be of any shape or size which can include a closed two-dimensional shape. The geo-fenced area 110 can also be three-dimensional, such as a closed three-dimensional volume (e.g., a building). The geo-fenced area 110 can be determined using a variety of suitable methods. For example, the geo-fenced area 110 can be a circular area determined as the area within a fixed radius from a central point (e.g., as a beacon). The central point can correspond to a physical location, such as a poll or a landmark, and can be chosen as any coordinate point. The geo-fenced area 110 can also be determined as the area contained within a polygon, where the polygon can be determined from three or more pre-determined coordinate points. The geo-fenced area 110 can be dynamically changed based on the time of day, a predetermined schedule, by manually modifying the parameters defining the geo-fenced area, or by dynamically modifying the parameters defining the geo-fenced area. For example, a circular geo-fenced area can be dynamically changed by increasing or decreasing the radius defining the geo-fenced area in response to, e.g., transaction activity and/or location tracking. The geo-fence can also be changed by manually changing the points that define the polygon enclosing a geo-fenced area. The geo-fenced area 110 can also be defined with a degree of uncertainty around the boundary of the geo-fenced area which can correspond to the expected uncertainty or imprecision in a GPS or similar system.

In some examples, the geo-fenced area 110, and the areas within it (e.g., the areas illustrated in FIGS. 1-4), can be defined by the application of a machine learning boundary definition model. For example, the boundary definition model can utilize location tracking information, transaction information, and/or other data described herein to make the boundary definition for the geo-fenced area 110 and the areas within it, and various boundary definition models can be generated. The exemplary systems, methods, and computer-accessible mediums described herein can then apply the generated boundary definition models to define or adjust the boundary of the geo-fenced area 110 and the areas within it. The boundary definition models can be applied to define the geo-fenced area 110, and the areas within it, at various times, including without limitation prior to an event, after an event, according to a predetermined schedule (e.g., hourly, daily, weekly), continuously during an event, continuously for a fixed time period, continuously for an unlimited time period, dynamically, and any combination thereof. The boundary definition model can be applied selectively to geo-fenced area 110 and/or one or more areas within it, or any combination thereof.

In some examples, various neural networks, such as convolutional neural networks ("CNN") or recurrent neural networks ("RNN"), can be utilized to generate the boundary definition models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The boundary definition model can be trained based on one or more training datasets. The training datasets can include transaction information selected from prior events or activities with geo-fenced zones or location information supporting transaction locations over time. The training datasets can The geo-fence can include two types of boundaries: a user-accessible boundary 111 and a user-inaccessible boundary 112. The user-accessible boundary 111 can correspond to physical checkpoints, such as a gate or a security checkpoints, near or at the boundary 111. This can be advantageous to monitor the method in which a user enters or leaves a geo-fenced area to ensure the user is in compliance with the social or ethical rules set for a particular boundary (e.g., time spent within the geo-fenced area, social distancing requirements).

The geo-fenced area can contain a communication point 113 to communicate with a user 101 or device 102. For example, communication point(s) 113 can include, or can be, a beacon using Bluetooth low energy ("BLE") beacons with open beacon format. However, other examples of suitable communication points can be used. A beacon can enhance the information available to the user 101 by providing additional context for the transactions that the user wishes to enter. Beacons can be one-directional beacons, which only broadcast information to a device. Beacons can also be two-way beacons, which receive contextual or location information from a device. Communication point(s) 113 can be aligned with a point defining the geo-fence, such as the center of the geo-fence. Multiple communication points can be incorporated within one geo-fence to increase the redundancy of the system, or program various communication points differently to better assist with user-tracking or geo-contextual information. The information transmitted can be financial or commercial in nature, such as whether purchases made from vendors within the secondary area bundled or discounted by the visit to the first zone. In another embodiment, the information transmitted can be configured by the user identifier associated with the device. For example, if the user identifier is of a higher priority, such as a season pass holder or a user with unlimited privileges, the information displayed on the device can remind the user of the privileges associated with his user identifier.

The geo-fenced area 110 can contain other geo-fenced areas 120, 130, 140, and 150, which can be partially or fully contained within the first bounded area. FIG. 1 illustrates a user 101 with a device 102, a first outer geo-fenced area 110, a second geo-fenced area 120, a third geo-fenced area 140, and a fifth geo-fenced area 150. These second geo-fenced areas can also have closed or open boundaries with the same properties of boundaries 111 and/or 112. The second area can be such that a visit to that location may not result in additional transactions, or additional costs. This can be useful for purchases of unlimited services, such as a viewing of a concert, or the purchase of unlimited goods, such as a soda machine with free-refills. The secondary area can contain a communication medium to communicate with device 102. This can facilitate the display of geo-contextual information about the area to the user 101.

The geo-fenced area 130 can be fully contained within the first area 110. Geo-fenced area 130 can also have a communication point 132 contained therein, which can be configured to transmit information unique to that location and limited to a transmission range from the communication point 132 corresponding to that particular area (e.g., geo-fenced area 130). Geo-fenced area 130 can have more than one communication point which can be configured for varying purposes. One communication point can be configured to allow the point to transmit and/or receive information to specific devices, while another communication point can transmit and/or receive information only to devices within the geo-fenced area 130, while yet another communication point can generally transmit and/or receive information to all devices present within its maximum range.

FIG. 1 also illustrates a second geo-fenced area 140 and a third geo-fenced area 150, both of which can be contained within geo-fenced area 110. Geo-fenced areas 140 and 150 can be such that one area is entirely contained within another. Further, the second area geo-fenced area 140 and the third geo-fenced area 150 can overlap partially or be contained within one another. In an exemplary embodiment, the second geo-fenced area 140 can be a larger themed area, such as a food court, and the third geo-fenced area 150 can be a smaller attraction, such as a soda machine. It can be possible to not create a transaction history record and charge for the third zone within a certain time period of entering the larger second zone. Exemplary geo-fenced areas can include, without limitation, shopping malls, zoos, amusement, sports stadiums, college or corporate campuses, towns or portions of a town, an individual building or group of buildings, and other areas.

When the second geo-fenced area 140 and the third geo-fenced area 150 overlap, a user's transition from the second geo-fenced area 140 to the third geo-fenced area 150 through the overlapping area can be advantageously utilized to create additional rules or payment schemes. For example, if a user is in a second geo-fenced area 140 and moved from there into a third geo-fenced area 150, a discount may be provided based on the transfer. For example, the second geo-fenced area 140 can be a food-court and the third geo-fenced area 150 can be a movie theater, and the user may be offered a discount on admission to the movie theater. The rules describing such transactions are further described below.

The use of communication points, such as communication point 113 can allow the user to indicate at which of the geo-fenced boundaries the user intends to create a transaction. The communication point 113 can be, without limitation, an area served by Wi-Fi, WLAN, RF, radio, IR, Bluetooth, cellular, near-field communication, any combination thereof, or any other appropriate architecture or system that facilitates the communication of signals, data, and/or messages. The user can also indicate his preference through a communication medium such as SMS, a phone call, or responding to a notification on his device. This additional check can be beneficial when the accuracy of the geo-location systems is low. Information generated in this manner can be used to understand metrics associated with the two locations, such as a correlation between the second zone and the third zone. Using various suitable statistical methods, useful information related to the zones can be generated.

The exemplary system, method, and computer-accessible medium can be used to define a plurality of areas with any number of intersections within the first area. Various shapes and topologies can be defined. For example, any topology defined by the countably finite intersection of any number of closed, half-closed, or open sets as areas of real numbers mapping from the set of values of $R^2$ or $R^3$, where the set $R^2$ is defined to be set of possible geographical coordinates in two-dimensional ("2D") space, and R to be set of possible geographical coordinates in three-dimensional ("3D") space, can be used. The area defined by the intersection of two geo-fenced areas can be considered another geo-fenced area.

For example, device 102 can be in communication with a server 170 using a network 160. When the device 102 enters the geo-fenced area 110, the device can trigger the payment workflow. For example, upon entry into the first geo-fenced area 110, the device 102 will either continuously, or at discrete intervals, record both the geo-location of the device 102, as well as a time stamp associated with each recorded geo-location. The device can additionally record information prior to the entry of the geo-fence area 110, such as the geo-coordinates at which the device crossed the boundary of the geo-fenced area 110, the velocity of entry, and whether the user was permitted to enter through the boundary of the geo-fenced area. Records can be used, which can include additional meta-data such as the latest time of communication with a communication point, the nature of the information communicated between the device and the communication point, the last time of synchronization of the records with a server, the identity of the geo-fenced area the device is present in, the velocity of the device, the orientation of the device, unique hardware identifiers associated with the device, and a unique user identifier associated with the user of the device. These records can also be transaction history records. Upon being processed (described below) by a server, the geo-location and time records, will correspond to transactions. Transaction history records can also be created independently of, and in parallel with, the location and time records on the device.

Device 102 can monitor, record, and flag the times at which it is not able to accurately record a geo-location, or when the degree of precision of the geo-location is low. This information can be used to extrapolate a user's location from user patterns. Device 102 can monitor the degree of imprecision that is associated with each record created on the device. As described below, additional information on the precision of measurements can advantageously be used in case a user later disputes the accuracy of a transaction.

Device 102 can record and/or transmit its location and corresponding time the server 170. This transmission can occur at periodic intervals or can occur upon exiting the geo-fenced area 110. A transmission can occur upon entering and exiting any particular geo-fenced area. Transmissions can also occur at pre-determined times, such as midnight, or times corresponding to the opening or close of a business.

The creation of a transaction history record can include creating at least one lighting network between the device 102 and the server 170. The server 170 can then process the geo-location and time-location information based on rules connected with the user-ID, geo-location, and time-location. Upon exiting the geo-fenced area 110, from a user-accessible boundary 111, device 102 can automatically cause the records related to the geo-location and the time-location to be sent to the server 170 through a network 160.

The network 160 can be one or more of a wireless network, a wired network, or any combination of wireless network and wired network, and may be configured to connect device 102 to server 170. For example, network 160 can include one or more of a fiber optics network, a passive optical network, a cable network, an Internet network, a satellite network, a wireless local area network (LAN), a Global System for Mobile Communication, a Personal Communication Service, a Personal Area Network, a Wireless Personal Area Network, a Wide Body Area Network, Wireless Application Protocol, Multimedia Messaging Service, Enhanced Messaging Service, Short Message Service, Time Division Multiplexing based systems, Code Division Multiple Access based systems, IEEE Ethernet 902.3, D-AMPS, Wi-Fi, Fixed Wireless Data, IEEE 802.11b, 802.15.1, 802.11 n and 802.11g, Bluetooth, NFC, Radio Frequency Identification (RFID), Wi-Fi, and/or the like. In some examples, the network 160 can be the Internet.

In addition, network 160 can include, without limitation, telephone lines, fiber optics, IEEE Ethernet 902.3, a wide area network, a wireless personal area network, a LAN, or a global network such as the Internet. In addition, network 160 can support an Internet network, a wireless communication network, a cellular network, or the like, or any combination thereof. Network 160 may further include one network, or any number of the exemplary types of networks mentioned above, operating as a stand-alone network or in cooperation with each other. Network 160 can utilize one or more protocols of one or more network elements to which they are communicatively coupled. Network 160 can translate to or from other protocols to one or more protocols of network devices. Although network 160 is depicted as a single network, it should be appreciated that according to one or more examples, network 160 may comprise a plurality of interconnected networks, such as, for example, the Internet, a service provider's network, a cable television network, corporate networks, such as credit card association networks, and home networks.

The server 170 can be a dedicated server computer, such as bladed servers, or can be personal computers, laptop computers, notebook computers, palm top computers, network computers, mobile devices, wearable devices, or any processor-controlled device capable of supporting the system 100. In some examples, the server 170 can be one or more devices 102. While FIG. 1 illustrates a single server 170, it is understood that other embodiments can use multiple servers or multiple computer systems as necessary or desired to support the users and can also use back-up or redundant servers to prevent network downtime in the event of a failure of a particular server.

For example, the user 101 can receive a notification on his or her device 102 informing him that he has entered a geo-fenced area. This can be accomplished through a notification on a mobile application or through another medium, such as an automated call or SMS text message. The notification can also be transmitted through the communication points described generally herein. The user 101 can also decline the transaction through the device 102, or the user can decline the transaction by exiting the geo-fenced area within a certain defined time-period of entering the geo-fenced area.

Figure 2:
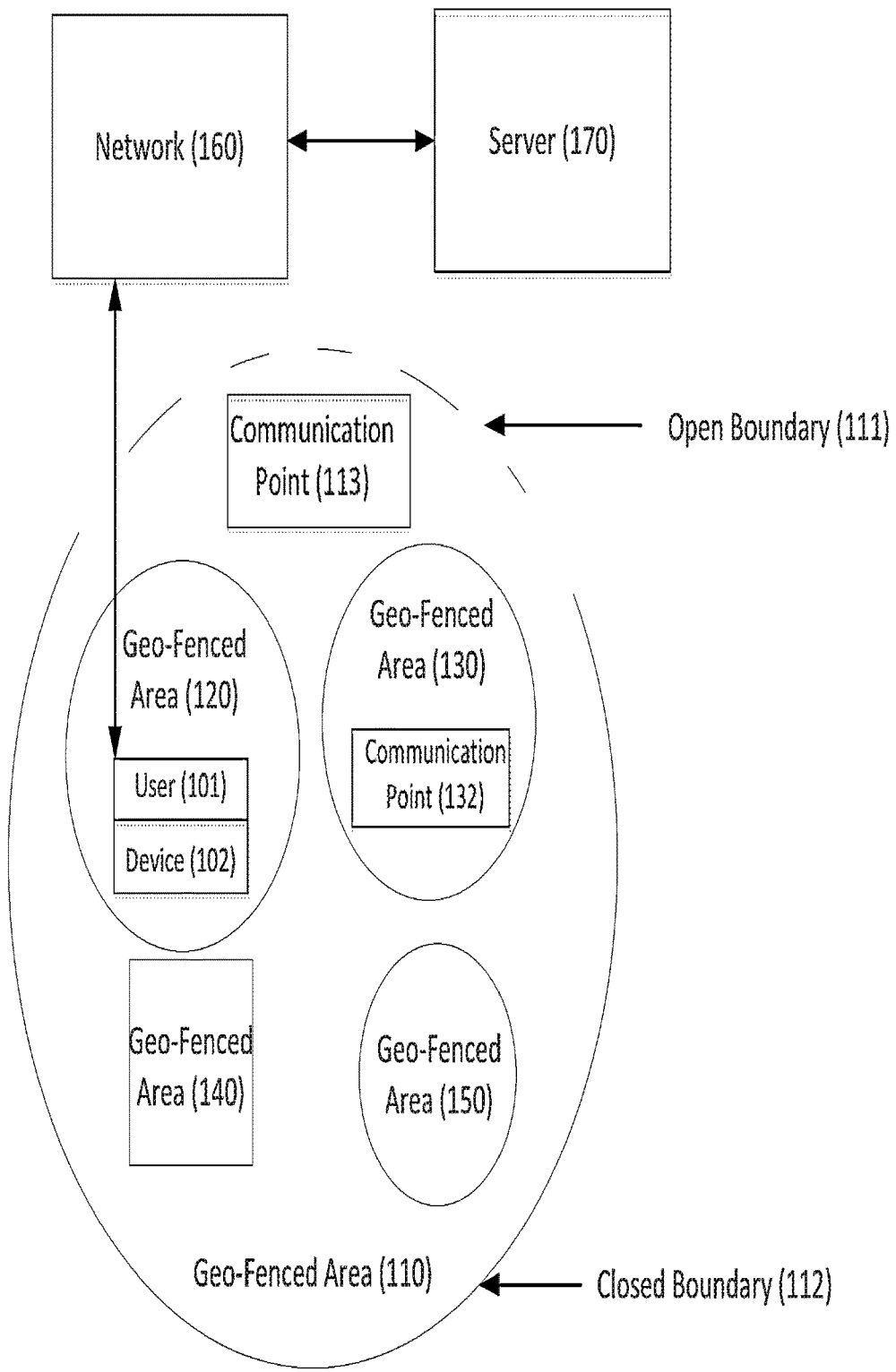
FIG. 2 is a diagram illustrating a geo-fenced location system according to an exemplary embodiment of the present disclosure.

FIG. 2 is a second diagram illustrating system 100 according to an exemplary embodiment. FIG. 2 illustrates user 101 with device 102, first geo-fenced area 110, a plurality of second geo-fenced areas 120, 130, 140, 150, and communication points 113 and 132. The device 102 can be in communication with the network 160, which can in turn communicate with the server 170.

Upon crossing into any of the second geo-fenced areas, such as geo-fenced area 120, device 102 can be in communication with a network to transmit information relating the users. Upon entry into the area, device 102 can continuously record the geo-location and time of the user. This information can also be transmitted upon exiting the second geo-fenced area 120 automatically.

By processing the time spent in the second geo fenced area, information relating to the user can be generated using statistical or other methods. Information generated in this manner can be advantageous to understand metrics associated with the secondary location, such as average consumption of goods, average amount of time spent, and the number of users who enter the location and do not purchase a good or service.

Figure 3:
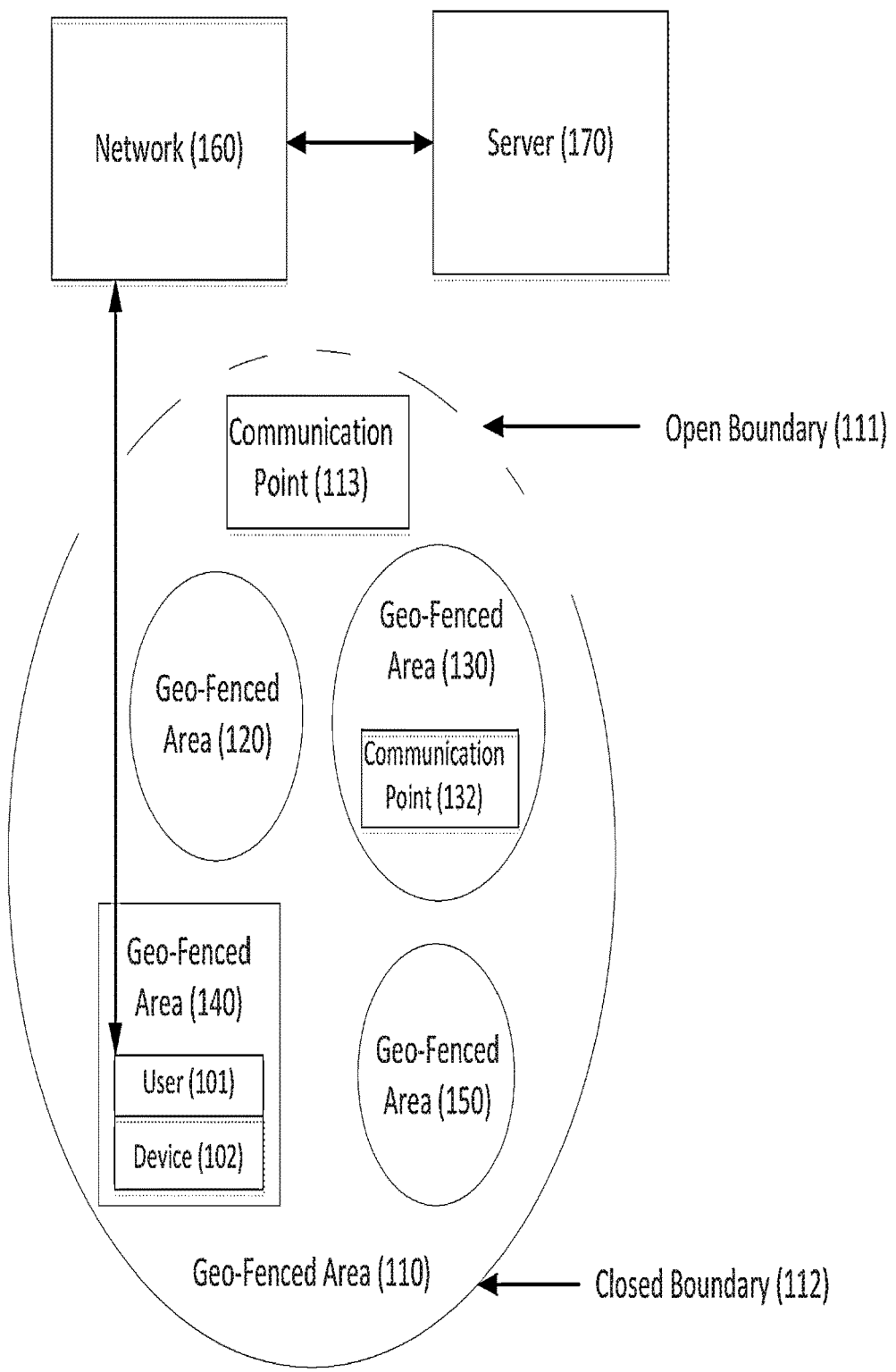
FIG. 3 is a diagram illustrating a geo-fenced location system according to an exemplary embodiment of the present disclosure.

FIG. 3 is a second diagram illustrating system 100 according to an exemplary embodiment. FIG. 3 illustrates transactions of a user in a second geo-fenced area separate from the geo-fenced area described in FIG. 2. FIG. 3 shows user 101 with device 102, first geo-fenced area 110, a plurality of second geo-fenced areas 120, 130, 140, 150, and communication points 113 and 132. The device 102 can be in communication with the network 160, which can in turn communicate with the server 170.

Upon entering one of the geo-fenced areas, such as 120, 130, or 150, the user can decide to visit a different second geo-fenced area, such as geo-fenced area 140. Upon exiting one of the first set of geo-fenced areas such as 120, a transaction record as described herein may be transferred to the server 170. As the user moves through the first geo-fenced area, 110, the device may record and/or transmit information to the server about the user's movement through the geo-fenced area 110. However, it is also possible that the device can be configured to not record information as it recognizes that it is moving through the first geo-fenced area 110. Upon entering the geo-fenced area 140, the device 102 may record and/or transmit information to server 170. The geo-fenced area 340 can contain additional criteria or different criteria from the other geo-fenced areas 110, 120, 130, 150. These criteria can include different financial rules or rules for frequency of transmission to the server 170 (e.g., transaction frequency, transaction times, transaction amount, spending limit, credit score, credit history, account activity, account balances, account history).

Figure 4:
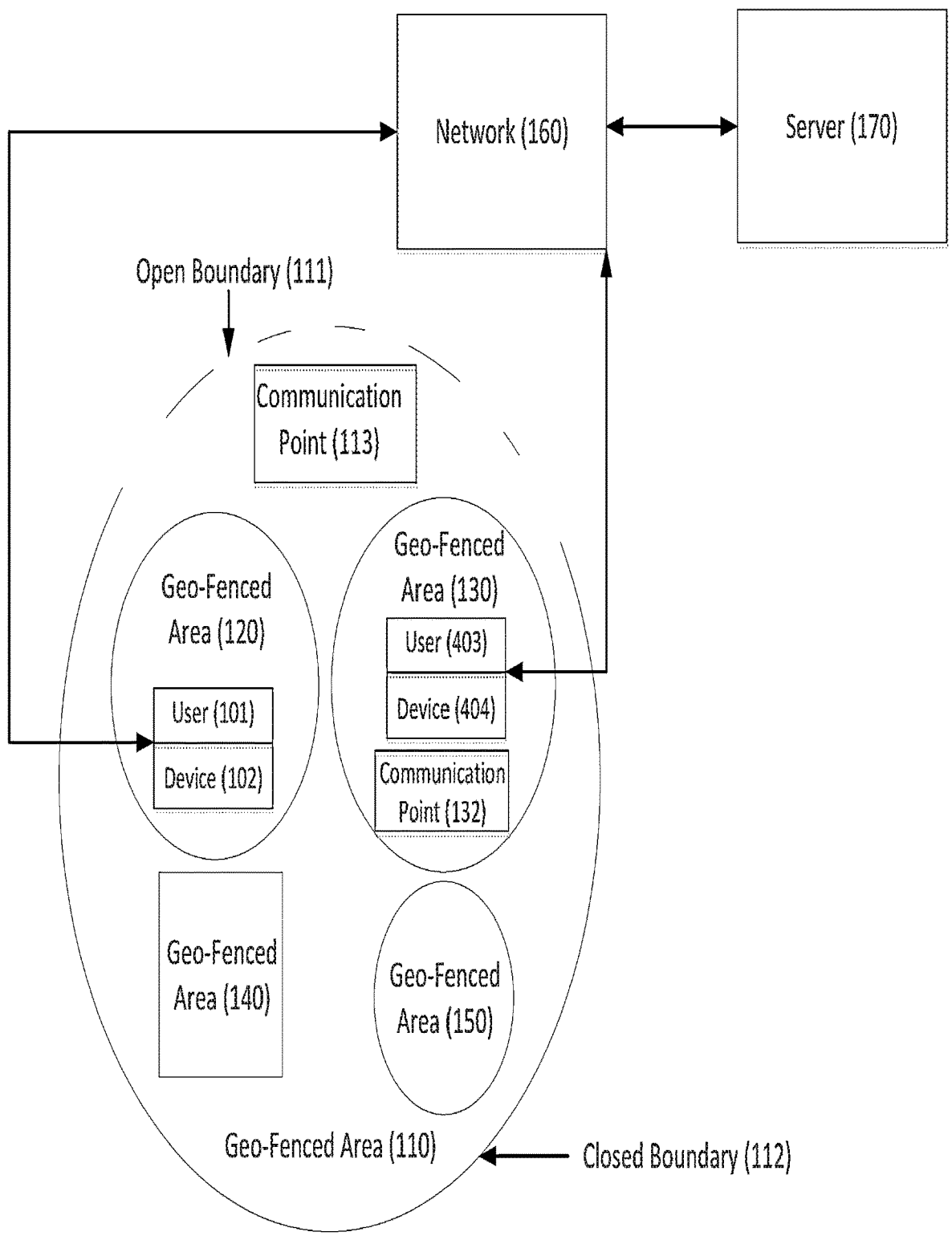
FIG. 4 is an exemplary diagram illustrating a geo-fenced location system according to an exemplary embodiment of the present disclosure.

FIG. 4 is a fourth diagram illustrating system 100 according to an exemplary embodiment. FIG. 4 illustrates transactions of a user for multiple users where a single transaction can be created for multiple users and shows user 101 with device 102, user 403 with device 404, first geo-fenced area 110, a plurality of second geo-fenced areas 120, 130, 140, 150, and communication points 113 and 132. The devices 102 and 404 can be in communication with the network 160, which can in turn communicate with the server 170.

FIG. 4 illustrates user 101 and device 102 within geo-fenced area 120 and user 403 and device 404 within geo-fenced area 130. The user 101 can have his or her own user identifier on device 101 and user 403 can his or her own user identifier device 404. The users 101 and 403 can also share a user identifier. The devices for the users can be in communication with the network 160, which can in turn communicate with server 170. Users 101 and 403 can independently conduct transactions in separate secondary geo-fenced areas 120, 130, 140, and 150, and independent records of their transactions can be created. Upon communication of the records with the server 170, the server can recognize that the users 101 and 403 are linked and create a single transaction record request for remittance.

Records created by the device 102 and device 404 can be transferred to a server 170 through a network 160. The records can be transferred using the communication points described above. Upon receipt of the records created by the device, the server 170 can process the various GPS coordinates based on rules associated with each coordinate and time record. The server 170 can contain logic to optionally parse the information contained in the records and organize the information into a database. Various suitable databases can be used. For example, without limitation, Hierarchical Database Models, Network Database Models, Object-Oriented Database Models, Star Schema Models, and N-Tier Database Systems can be utilized. The server can also organize the information as a sequence of time values and associated geo-location values, along with any available meta-data. The server can calculate metrics based on the meta-data available. For example, the server can calculate the geo-fenced area that corresponds to the recorded transaction history records. Additionally, based on the available geo-location, and the recorded uncertainty in measurement, the server can calculate for each time, a circular area within the geo-location as the center, and the uncertainty as the radius in which the user can be located, and match that circular area with a list of possible geo-fenced areas.

The rules can be based on meta-data associated with the records. The server can match recorded geo-coordinates with a location within the first geo-fenced area and create a singular transaction for all activities performed by a user within a geo-fenced area.

For example, a user can enter a geo-fenced area containing several attractions, such as a concert, a sporting event, a movie theatre, a food court, and a vending machine. The device can record the geo-location and time spent at each location within the geo-fenced area. The server can, based on the location and the time-spent in the area, create a transaction associated with each attraction based on flexible and customizable rules. For example, rules can dictate that upon entering the geo-locations corresponding to the concert, a flat-fee of $5 is to be paid. Further, additional time-based rules for the concert can apply (e.g., for every 15-minute interval spent at the interval, a fee of $2 can apply, but for each hour, a $5 fee can apply). For other areas, such as the food court or vending machines, fees may only apply for each entry or exit into the geo-fenced area associated with the respective area. Areas such as the movie theatre may only have time-based rules. The server can then modify these transactions based on information associated with the user identifier of the device. For example, the user identifier can grant privileges for unlimited movies, thereby discounting that part of the transaction to no fee. Other information, such as a discount code received from a communication point, can also be included in the information transmitted, allowing for the appropriate codes to be applied. Bundling of goods or services can similarly be handled. For example, if a single visit to a vending machine is included with a movie, the server can contain logic to appropriately process such a situation by counting the number of visits to a vending machine, and entirely discounting one visit.

In a three-dimensional case, additional use cases can be explored. For example, a three-dimensional geo-fenced area can also be advantageously used to, for example, create transactions based on how many floors an individual rode, or how much of a private mountain trail was trekked.

The server can additionally use data present in the records for more sophisticated processing. For example, if two areas overlap, the server can distinguish which of the two areas the individual was visiting based on the meta-data (e.g., the user's velocity). The same area can have an attraction such as a roller-coaster and a concession stand. The average velocity of the user in that area can advantageously distinguish between the two zones. Other meta-data, for example, the orientation of the device can be used. Additional information, such as a coupon transmitted from a communication point to a user, may also be part of the information included in the processing.

Other server-side logic can be used for creating and remitting transactions. For example, several user identifiers (IDs) can be linked together, and upon recognizing these IDs as belonging to a pre-determined group, the server can provide an additional discount or process a singular transaction for remittance for the entire group. The server can also modify the costs associated with a geo-fenced area after the creation of the record. If an area (e.g., a concert) is inaccessible due to inclement weather, costs associated with that area can be nullified by the server.

Mathematically, the set of rules on the server can be defined as a function with n-variables being mapped into a singular output, (e.g., the value of the singular transaction). Upon processing all the records, the server can create a singular amount for remittance from an account associated with the user. The request for remittance can be done performed through a traditional financial network, such as a credit card or bank account.

The financial request can also be made through a blockchain or cryptocurrency payment network. A final transaction can be recorded on the blockchain while the information received through the day can be recorded on a secondary network (e.g., a lightning network). A lightning network is a system built on top of cryptocurrency systems that can facilitate people to instantaneously send/receive payments and reduce transaction fees by keeping the transactions off the main network. This can be advantageous as transactions on a blockchain network can be computationally intensive and are of relativity fixed cost despite the amount being transacted. Further, such transactions can be slow and inefficient. Further, the overall efficiency of a global blockchain can be impaired when many transactions are occurring.

In a lightning network, the user 101 and the server 170 can create an open payment channel on the blockchain between the user and the server upon the user first entering the first geo-fenced area 110. After this payment channel is set up, it is possible for these two parties to conduct an unlimited amount of transactions without ever affecting the information stored on the blockchain. Throughout the day, as information is received from the device, the payment channel can stay open. However, the smaller transactions throughout the day will not be recorded on the blockchain. With each transaction, both parties sign an updated balance sheet to always reflect how much of a cryptocurrency or other currency stored in the multi-signature wallet belongs to whom. This updated balance sheet is not stored on the main cryptocurrency network, but both parties keep their own copies of it. This is automatically done as the device 102 records the geo-location and time location of the user throughout the day. The lightning network's use of payment channels allows user and the server to transact directly rather than broadcasting the business to the entire world (aka on the public blockchain). When a final transaction is processed, the smaller transactions from the lightning network can be accumulated. Then, a single transaction can be written to the blockchain. In some embodiments, the credit available to the user can be considered. In these cases, the user would be permitted to spend up to his or her credit limit in one or more transactions, but could not exceed this limit. This can be monitored by, for example, an application programming interface (API), or a plurality of APIs, established by financial or other institutions responsible for granting and monitoring credit.

Figure 5A:
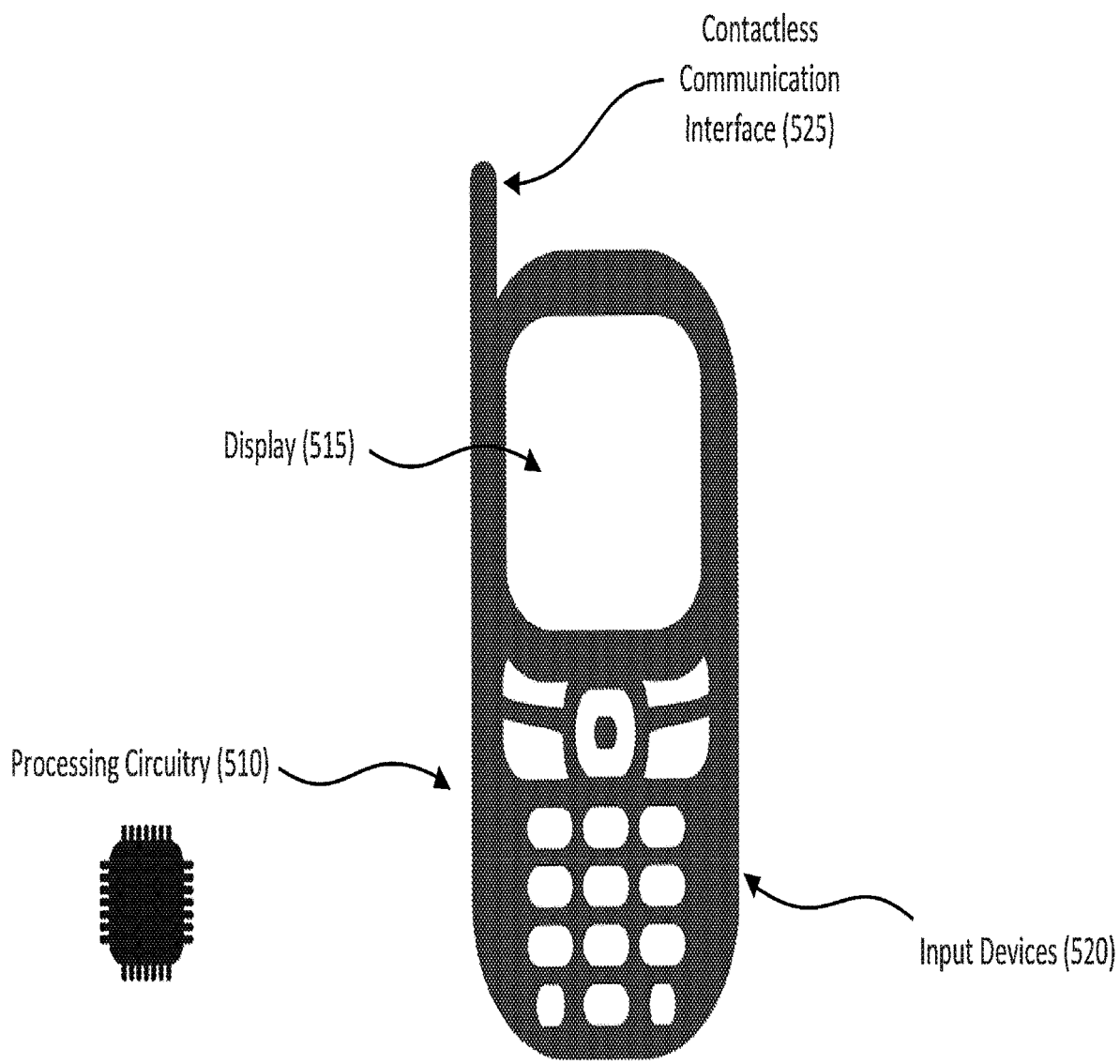
FIG. 5A is a diagram of a device according to an exemplary embodiment of the present disclosure.

FIG. 5A is diagram showing device 500, which may be carried by a user. The device 500 can include processing circuitry, 510, a display, 515, input devices 520, and a contactless communication interface 525. The device 500 can be a mobile device, smartphone, a laptop computer, a personal computer, or any computing device capable of storing, sending, and receiving data.

The device can contain processing circuitry 510 and a contactless communication interface 525. The contactless communication interface 525 can be of any suitable technology capable of sending or receiving data over a distance. Examples of such technology include, for example, Wi-Fi, WLAN, RF, radio, IR, Bluetooth, cellular, near-field communication, any combination thereof, or any other appropriate architecture or system that facilitates the communication of signals, data, and/or messages. Similarly, any suitable hardware level and software level algorithm can be chosen to allow for the transfer of data from and to the device. Examples of algorithms that can be the asynchronous connection-less protocol, synchronous connection-oriented link, link management protocol, host controller interface, or low energy link layer.

The device can contain a display a 515 and input devices 520. The display 515 can be selected from any suitable two-dimensional or three-dimensional display, such as a light-emitting diode, liquid crystal display, digital light processing display, or organic light-emitting diode display. The user interface can be selected from any suitable user input device such as a touchpad, a touchscreen, a mechanical switch, natural language user interface, a click-wheel, QWERTY keyboard, mouse, gesture recognition, or capacitive touchscreen.

Figure 5B:
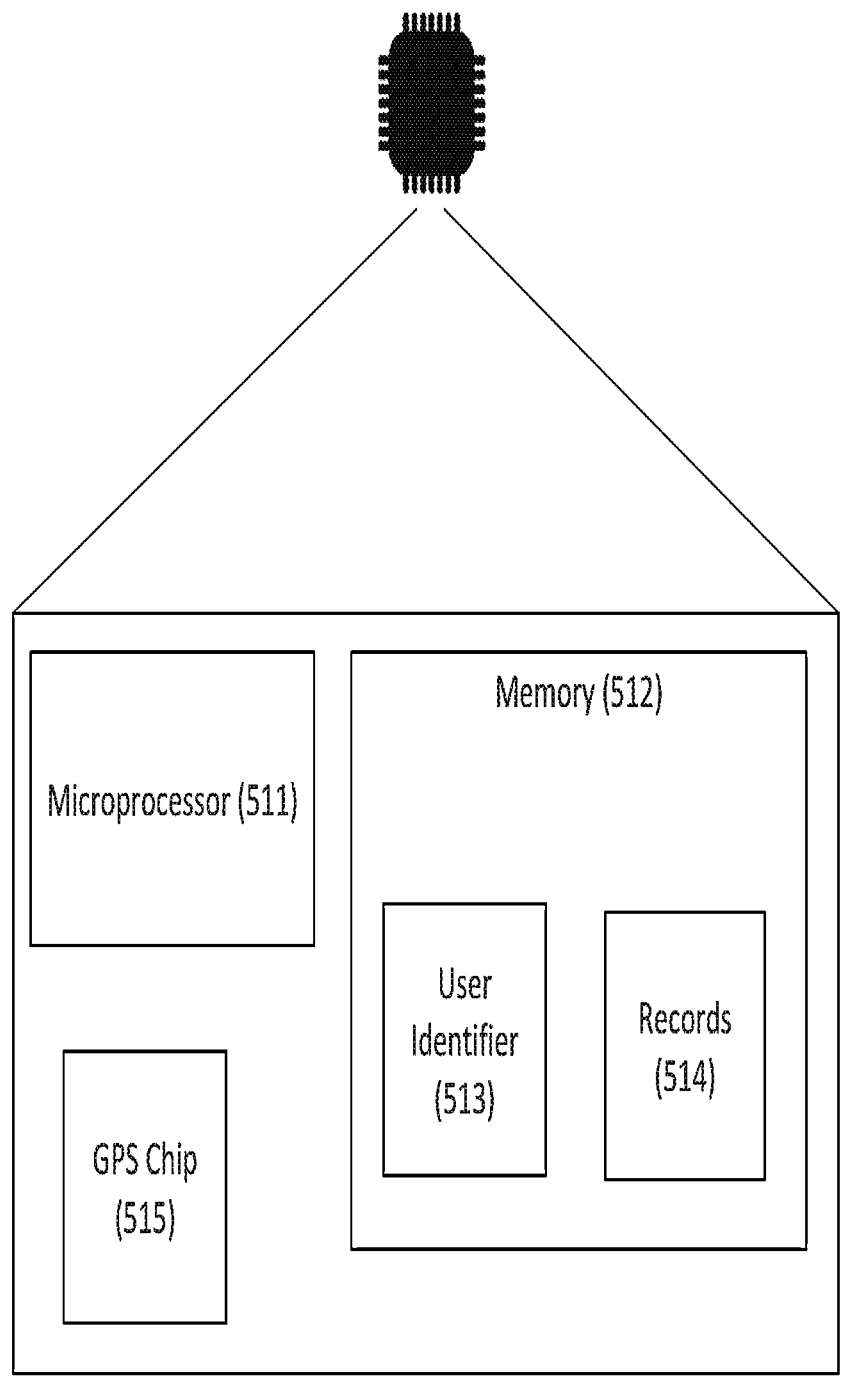
FIG. 5B is a diagram illustrating the processing circuitry of the device from FIG. 5A according to an exemplary embodiment of the present disclosure.

FIG. 5B is a diagram showing an expanded view of the processing circuitry 510 according to an example embodiment. The processing circuitry 510 can include a microprocessor 511 and a memory 512. The processing circuitry can contain additional components, including processors, memories, error and parity/CRC checkers, data encoders, anticollision algorithms, controllers, command decoders, security primitives and tamperproofing hardware, as necessary to perform the functions described herein.

The memory 512 can be a read-only memory, write-once read-multiple memory or read/write memory, e.g., RAM, ROM, and EEPROM, and a device 500 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory 512 can store at a user identifier 513 and data in the form of records 514. The memory 512 can be divided into several zones, with each zone having a different level of security. The microprocessor 511 can keep track of which memory addresses belong to which zones and the circumstances under which each zone can be accessed. The memory 512 can be divided into four zones: a secret zone, a confidential zone, a usage zone, and a public zone.

The secret zone can be used for storage of information which can be used only by the microprocessor 511, for example, passwords, cryptographic keys. The information stored in this zone is not readable outside of the device. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

The confidential zone can be used to store a list of all transactions made with the device. The confidential zone can have password protection. The password can be known only to the financial institution, which can examine the history of the device for evidence of misuse of the system. The confidential zone can have a read-only access restriction so that the information stored in this zone may not be modified by the user, e.g., the list of GPS locations may not be modified.

The usage zone can be used for storage of information which can be periodically updated or modified. Depending on the sensitivity of the data, a password can be implemented for this zone. The usage zone can have both read and write access protected by a password. The usage zone may keep a list of the most recent transfers made by the device and include additional data about those transfers, such as the time, place, and hardware ID of the device to which the transfer was made. A public zone can be used for keeping less sensitive information, such as the device user's name or ID.

The public zone can be used to secure information that is public facing or requires less security or confidentiality. This can include information such as the user ID.

It is understood that the assignment of data to security zones is not limited in the examples described above, and the present disclosure provides for different assignments of data based on data sensitive and the needs of the transaction.

The user identifier 513 can be a digital identifier that identifies a user who possesses a device 102. The user identifier 513 can correspond to one or more financial accounts the user possesses with a financial institution. This identifier can be specific to the user and corresponds to the user's account on the financial institution's servers, as described below. The user identifier can be stored in the secret zone of the memory 512. The user identifier can also correspond to a user's blockchain address.

A record 514 stored on memory 512 can store the GPS coordinates and the time the coordinates were recorded. Additionally, the record 514 can contain additional information, such as the battery life of the device, the orientation of the device, the type of communication being utilized by the device, accelerometer measurements of the device, average velocity of the device, etc.

Figure 6:
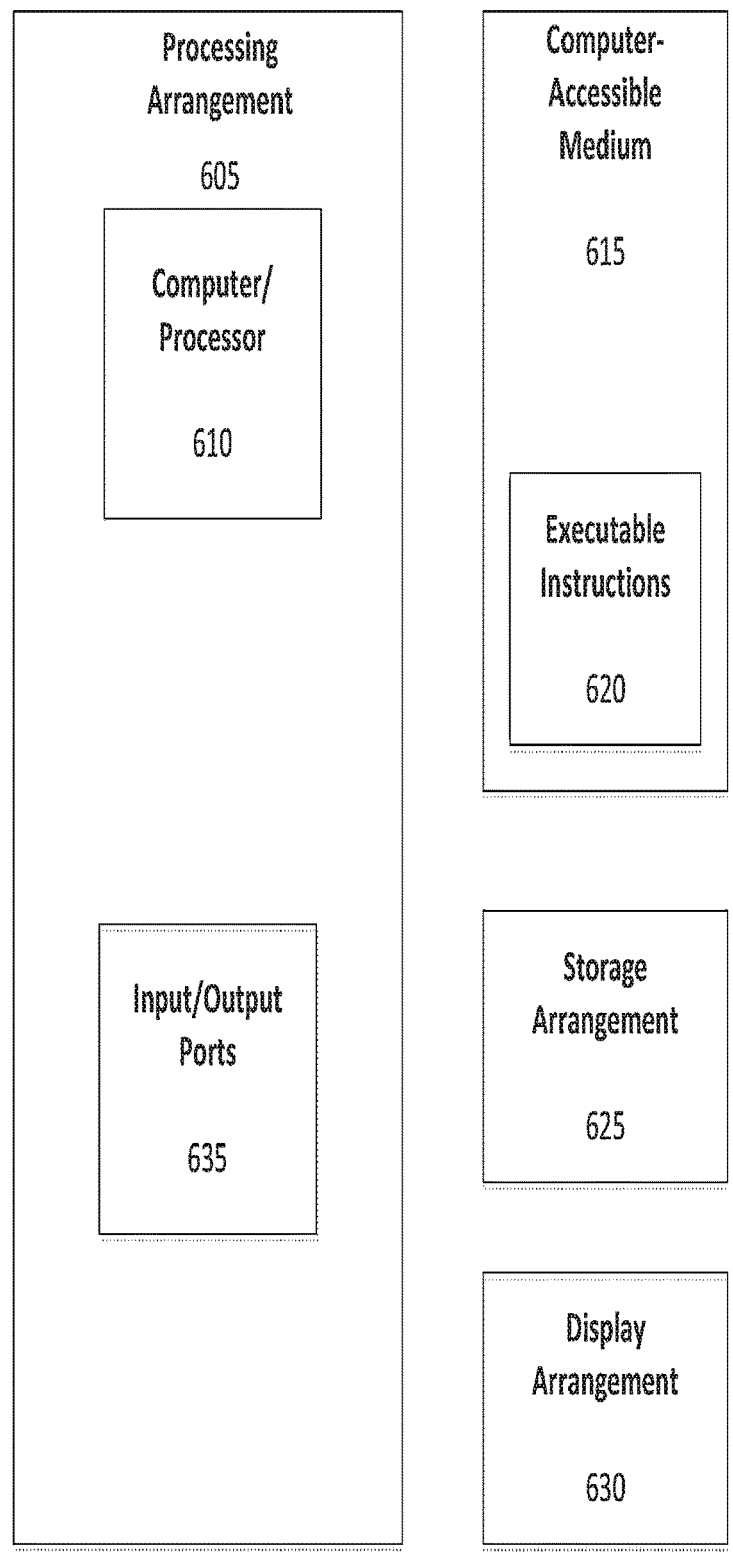
FIG. 6 is a diagram of a server system according to an exemplary embodiment of the present disclosure.

FIG. 6 shows a block diagram of an exemplary embodiment of a system 600 according to the present disclosure, which can be used to perform the procedures described below. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition, or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example.

Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

Figure 7:
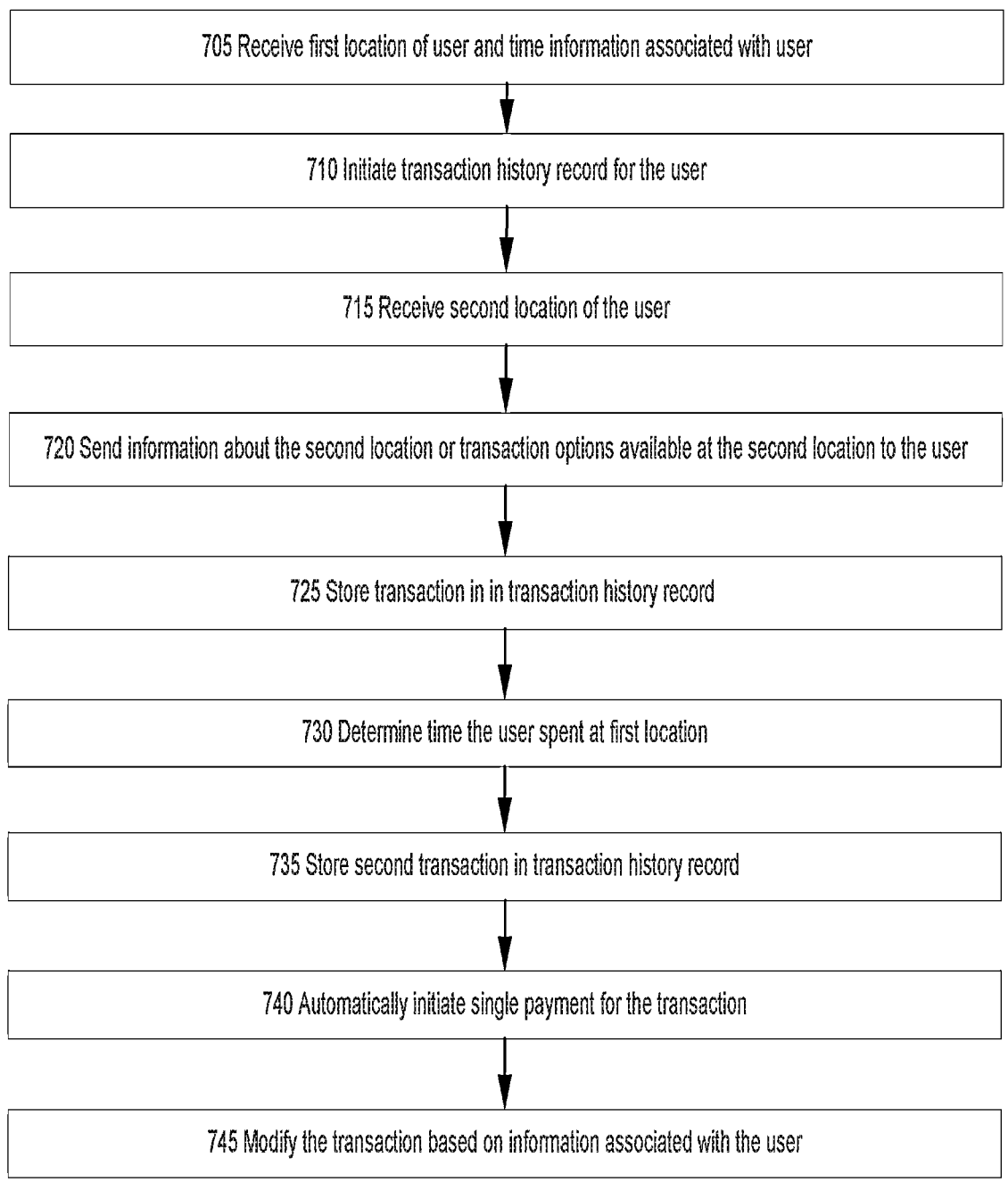
FIG. 7 is a flow diagram of a method for automatic transactions according to an exemplary embodiment of the present disclosure.

FIG. 7 shows an exemplary flow diagram of a method 700 according to an exemplary embodiment of the present disclosure. For example, at step 705, a first location of a user and time information associated with the user can be received. At step 710, a transaction history record for the user can be initiated based on the location and the time. At step 715, a second location of the user can be received. The second location can be a second bounded area that can be contained within the first bounded area. At step 720, information about the second location or transaction actions available to the user at the second location can be sent to the user. At 725, a transaction can be stored in the transaction history record. This can be done either locally on the device or on the server. At step 730, the time the user spent at a first location can be determined. At step 735, a second transaction can be stored in the transaction history record. At step 740, a single payment for the transaction can be automatically initiated. This can be performed on the server after compiling and processing the information. At step 745, the transaction may be modified based on information associated with the user. Such information can include information associated with a user identifier, such as the user's status at the park. The submission of the single payment can occur on any financial, blockchain, cryptocurrency, or proprietary network.

The method may also be modified by examining additional criteria associated with the user. One criteria can include that the at least one user is a season pass holder, and another criteria can include that the at least one user is eligible to receive a discount.

Figure 8:
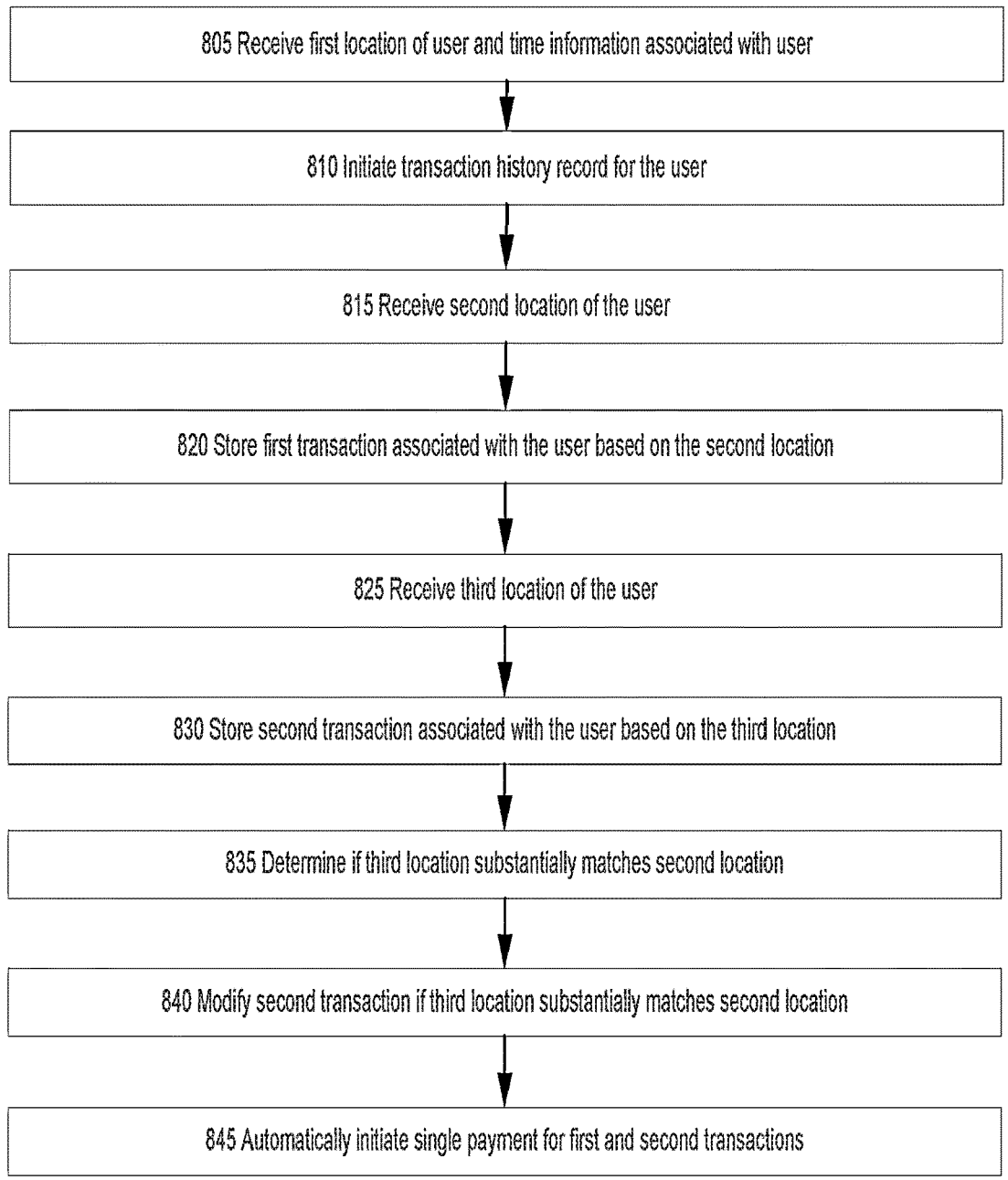
FIG. 8 is a flow diagram of a method for automatic transactions according to an exemplary embodiment of the present disclosure.
Figure 9:
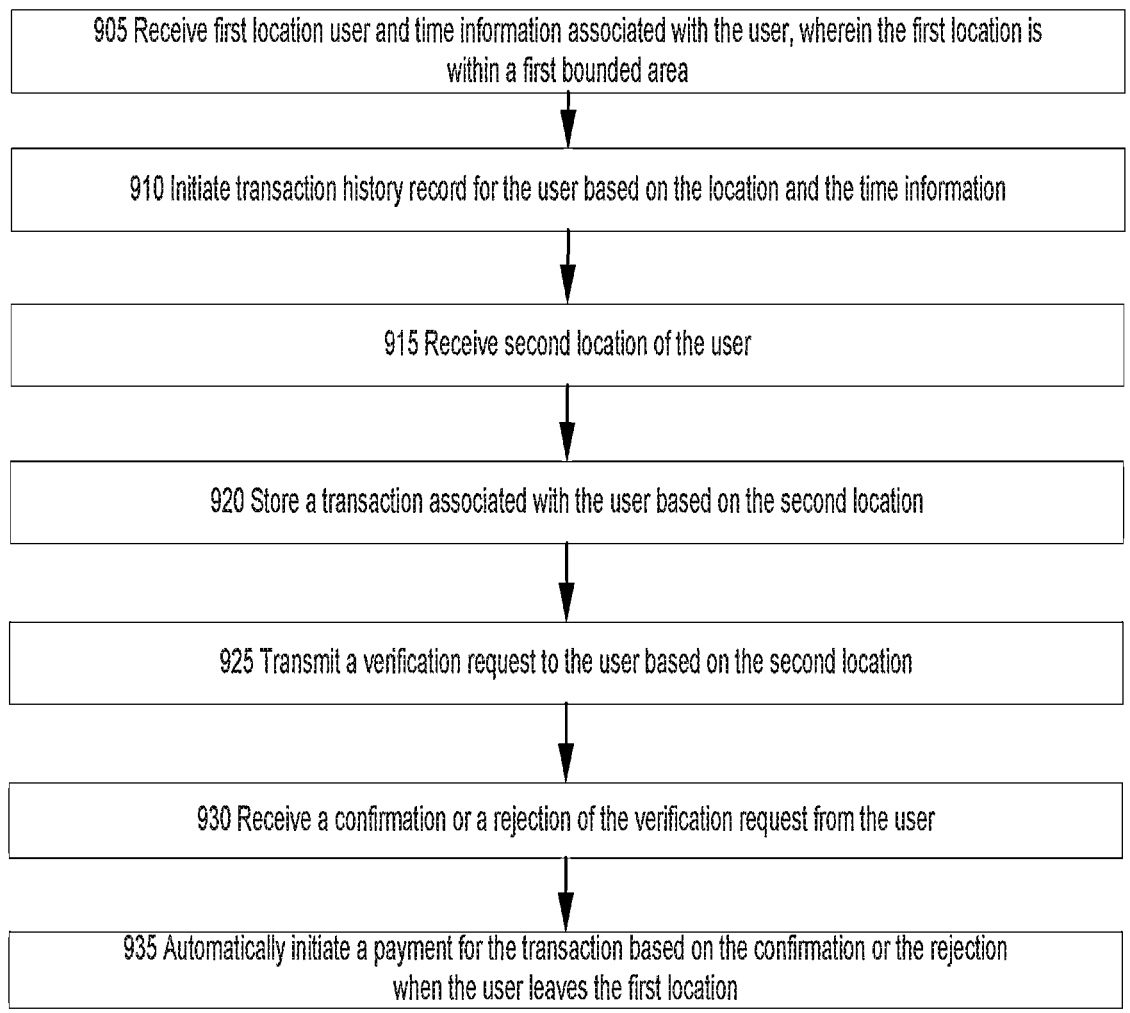
FIG. 9 is a flow diagram of a method for automatic transactions according to an exemplary embodiment of the present disclosure.

FIG. 8 describes one embodiment of the present invention, method 800, where geo-locations can be used to create a single transaction. For example, at step 805, a first location of at least one user and time information associated with the user can be received. At step 810 a transaction history record for the at least one user based on the location and the time can be initiated. At step 815 a second location of the user can be received. At step 820 a first transaction associated with the user based on the second location can be stored. At step 825, a third location of the user can be received. At step 830, second transaction associated with the user based on the third location can be stored. At step 835, a determination can be made to see if the third location substantially matches the second location. This can be done by comparing the GPS locations of the two locations. This can also be done by examining if there is an overlap in the time spent at the second and third locations or if the sequence of time spent by the user varies between the two locations. This can also be done by examining the expected error bounds of the geo-tracking on the devices. At step 840, if the third location is found to be substantially the same as the second location, the second transaction can be modified. At step 845, a single payment for the transaction can be automatically initiated for the first and second transactions. The method may also include modifying the transaction based on additional received from the user. the FIG. 9 describes one embodiment of the present invention, a method 900 of using geo-locations to create a single transaction. The method can include a first step, 905, where the first location and time information associated with the user is received, where the first location is within a first bounded area. At step 910, a transaction history record for the user can be initiated based on the time and location information. At step 915, a second location of the user can be received. At step 920, a transaction associated with the user based on the second location can be stored. This can be done through the internet or through a local network, using local communication devices such as Bluetooth. This can also be done through calling or messaging the user. At step 925, a verification request to the user based on the second location can be transmitted. At step 930, a verification or rejection of the request from the user can be received. At step 935, based on the confirmation or rejection received from the user when the user leaves the first location, a payment can be automatically initiated for the transaction. The method can be modified by changing the information being sent based on a time of day, or on the stored preferences of the user.

Exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a transitory and/or non-transitory computer-accessible medium (e.g., RAM, ROM, hard drive, or other storage device). For example, a computer-accessible medium can be part of the memory of the device 102, server 170, and/or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The present disclosure is not to be limited in terms of the particular embodiments described in this application, which are intended as illustrations of various aspects. Many modifications and variations can be made without departing from its spirit and scope, as can be apparent. Functionally equivalent methods and apparatuses within the scope of the disclosure, in addition to those enumerated herein, can be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method, comprising:
receiving, by a processor, a first location of a user device associated with a user and first time information associated with the user device;

receiving, by the processor, a second location of the user device and second time information associated with the user device;

dynamically defining a geo-fenced area by applying a machine learning boundary definition model to the first location and the second location;

generating an open payment channel for a cryptocurrency on a blockchain of a lightning network between the user device and the processor, based upon the user device entering the geo-fenced area;

generating a plurality of cryptocurrency transactions without modifying the blockchain based on the defined geo-fenced area; and recording, upon the user device exiting the defined geo-fenced area, a single transaction on the blockchain for the cryptocurrency based on the plurality of generated cryptocurrency transactions.

2. The method of claim 1, wherein the first location is within a first geographically bounded area.

3. The method of claim 2, wherein the second location is in a second geographically bounded area that is contained within the first geographically bounded area.

4. The method of claim 2, wherein the first geographically bounded area comprises a boundary and a degree of uncertainty around the boundary, and wherein the degree of uncertainty corresponds to a degree of error in the boundary.

5. The method of claim 1, wherein the transaction is generated prior to automatically initiating a single cryptocurrency payment.

6. The method of claim 5, wherein the step of automatically completing, by the processor, the transaction comprises automatically initiating, by the processor using the lighting network, the single cryptocurrency payment.

7. The method of claim 1, further comprising initiating, by the processor, a record for the user device associated with the user based on the first location and the first time information.

8. The method of claim 7, further comprising storing, in the record, at least the first location, the second location, and the transaction.

9. The method of claim 1, further comprising automatically completing, by the processor, the transaction.

10. The method of claim 1, wherein the transaction further comprises a transaction value, payment information and location information.

11. A non-transitory computer-accessible medium having stored thereon computer-executable instructions for automatically initiating a payment, wherein, when a computer arrangement executes the instructions, the computer arrangement is configured to perform procedures comprising:

receiving a first location of a user device associated with a user and first time information associated with the user device;

receiving a second location of the user device and second time information associated with the user device;

dynamically defining a geo-fenced area by applying a machine learning boundary definition model to the first location and the second location;

generating an open payment channel for a cryptocurrency on a blockchain of a lightning network between the user device and the processor, based upon the user device entering the geo-fenced area;

generating a plurality of cryptocurrency transactions without modifying the blockchain based on the defined geo-fenced area; and recording, upon the user device exiting the defined geo-fenced area, a single transaction on the blockchain for the cryptocurrency based on the plurality of generated cryptocurrency transactions.

12. The computer-accessible medium of claim 11, wherein the procedures further comprises modifying the transaction by at least increasing or decreasing a transaction value based on at least one parameter prior to automatically initiating a single cryptocurrency payment.

13. The computer-accessible medium of claim 11, wherein the second location is in a second geographically bounded area, and the procedures further comprises dynamically modifying the second geographically bounded area using a neural network and a trained boundary definition model.

14. The computer-accessible medium of claim 13, wherein the procedures further comprises transmitting to the user device, a verification request to initiate the single cryptocurrency payment based on the user device entering the dynamically modified second geographically bounded area.

15. The computer-accessible medium of claim 14, wherein the procedures further comprises receiving from the user device, a verification confirmation confirming the initiation of the single cryptocurrency payment based on the user device associated with the user entering the dynamically modified second geographically bounded area.

16. The computer-accessible medium of claim 15, wherein the procedures further comprises automatically initiating the single cryptocurrency payment based on the user device associated with the user entering the dynamically modified second geographically bounded area.

17. The computer-accessible medium of claim 15, wherein the procedures further comprises receiving a third location of the user device associated with the user, wherein the third location is in a third bounded area that is contained within the first bounded area.

18. A system comprising a server, wherein the server comprises a memory and a processor, and the processor is configured to:

receive a first location of a user device associated with a user and first time information associated with the user device;

receive a second location of the user device and second time information associated with the user device;

define a geo-fenced area by applying a machine learning boundary definition model to the first location and the second location;

generate an open payment channel for a cryptocurrency on a blockchain of a lightning network between the user device and the processor, based upon the user device entering the geo-fenced area;

record, upon the user device exiting the defined geo-fenced area, a single transaction on the blockchain for the cryptocurrency based on the plurality of generated cryptocurrency transactions.

19. The system of claim 18, wherein the processor is further configured to:

determine at least one criteria for the user, and modify the transaction by at least increasing or decreasing a transaction value based on the at least one criteria, wherein the at least one criteria includes at least one of (i) that the at least one user is a season pass holder or (ii) that the at least one user is eligible to receive a discount.

* * * * *